US012605825B2

(12) United States Patent
Shibata et al.

(10) Patent No.: US 12,605,825 B2
(45) Date of Patent: Apr. 21, 2026

(54) ROBOT

(71) Applicant: KAWASAKI JUKOGYO KABUSHIKI KAISHA, Kobe (JP)

(72) Inventors: Takeshi Shibata, Kobe (JP); Ryota Ono, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 5 days.

(21) Appl. No.: 18/730,031

(22) PCT Filed: Dec. 21, 2022

(86) PCT No.: PCT/JP2022/047171
§ 371 (c)(1),
(2) Date: Jul. 18, 2024

(87) PCT Pub. No.: WO2023/149114
PCT Pub. Date: Aug. 10, 2023

(65) Prior Publication Data
US 2025/0114933 A1 Apr. 10, 2025

(30) Foreign Application Priority Data

Feb. 3, 2022 (JP) ................................. 2022-015796

(51) Int. Cl.
| | |
|---|---|
| *B25J 9/06* | (2006.01) |
| *B25J 9/10* | (2006.01) |
| *B25J 11/00* | (2006.01) |
| *B25J 13/08* | (2006.01) |
| *B25J 19/02* | (2006.01) |

(52) U.S. Cl.
CPC ................. *B25J 9/06* (2013.01); *B25J 9/108* (2013.01); *B25J 11/0095* (2013.01); *B25J 13/081* (2013.01); *B25J 19/021* (2013.01)

(58) Field of Classification Search
CPC . B25J 9/108; B25J 19/0075; B25J 9/06; B25J 11/0095; B25J 19/021; B25J 13/081; H01L 21/677
See application file for complete search history.

(56) References Cited

U.S. PATENT DOCUMENTS

| | | | | |
|---|---|---|---|---|
| 9,717,563 | B2 * | 8/2017 | Tognaccini | ............ A61B 1/018 |
| 10,155,309 | B1 | 12/2018 | Blank | |
| 2020/0246092 | A1 * | 8/2020 | Robinson | ............... A61B 34/30 |

FOREIGN PATENT DOCUMENTS

| | | |
|---|---|---|
| JP | 2014-236036 A | 12/2014 |
| JP | 6588192 B2 | 10/2019 |
| JP | 2021-503720 A | 2/2021 |
| KR | 10-2016-0054465 A | 5/2016 |

(Continued)

OTHER PUBLICATIONS

Lovchik et al., The Robonaut hand: a dexterous robot hand for space, 1999, IEEE, p. 907-912 (Year: 1999).*

(Continued)

*Primary Examiner* — Mcdieunel Marc
(74) *Attorney, Agent, or Firm* — OLIFF PLC

(57) ABSTRACT

A robot includes a robot arm and a hand. The hand includes a first hand and a second hand arranged on or above the first hand. At least one of the first hand and the second hand has an airtight hollow hand space.

12 Claims, 3 Drawing Sheets

(56) References Cited

FOREIGN PATENT DOCUMENTS

KR          10-2150230 B1     8/2020

OTHER PUBLICATIONS

Stilli et al., Shrinkable, stiffness-controllable soft manipulator based on a bio-inspired antagonistic actuation principle, 2014, IEEE, p. 2476-2481 (Year: 2014).*
Chen et al., A robotic manipulator design with novel soft actuators, 2017, IEEE, p. 1878-1884 (Year: 2017).*
Wei et al., Performance Evaluation for Multi-arm Manipulation of Hollow Suspended Organs, 2008, IEEE, p. 147-157 (Year: 2008).*
Shiva et al., Tendon-Based Stiffening for a Pneumatically Actuated Soft Manipulator, 2016, IEEE, p. 632-637 (Year: 2016).*
Ohnishi et al., Anthropomorphic hand control for robotic hand-arm system, 2000, IEEE, p. 1255-1259 (Year: 2000).*
Zorn et al., A Novel Telemanipulated Robotic Assistant for Surgical Endoscopy: Preclinical Application to ESD, 2017, IEEE, p. 797-808 (Year: 2017).*
Hagn et al., Telemanipulator for remote minimally invasive surgery, 2008, IEEE, p. 28-38 (Year: 2008).*
Feb. 28, 2023 International Search Report issued in International Patent Application No. PCT/JP2022/047171.

* cited by examiner

ROBOT

TECHNICAL FIELD

The present disclosure relates to a robot.

BACKGROUND ART

Substrate-conveying robots including a first hand and a second hand arranged above the first hand are known in the art. Japanese Patent Publication No. JP 6588192 discloses a workpiece-conveying apparatus including a first arm and a second arm arranged above the first arm. In Japanese Patent Publication No. JP 6588192, the second arm includes a first hand and a second hand arranged above the first hand. The workpiece-conveying apparatus is arranged in a chamber whose interior is brought in a vacuum environment.

PRIOR ART

Patent Document

Patent Document 1: Japanese Patent Publication No. JP 6588192

SUMMARY OF THE INVENTION

Devices such as sensors are arranged on the first hand or the second hand of such a known workpiece-conveying apparatus is arranged in a chamber whose interior is brought in a vacuum environment as in Japanese Patent Publication No. JP 6588192 in some cases. In such a case, because the environment around the devices is in a vacuum, there is a problem that heat cannot be sufficiently dissipated from the devices.

The present disclosure is intended to solve the above problem, and one object of the present disclosure is to provide a robot allowing placement of a device while sufficiently dissipating heat from the device even in a case in which the robot is used in a vacuum atmosphere.

A robot according to one aspect of the present disclosure include a robot arm; and a hand arranged in a distal end part of the robot arm, wherein the hand includes a first hand, and a second hand arranged on or above the first hand and operating independently of the first hand, and at least one of the first hand and the second hand includes an airtight hollow hand space.

In the robot according to the one aspect of the present disclosure, as discussed above, at least one of the first hand and the second hand includes an airtight hollow hand space. According to this configuration, because a device such as a sensor can be arranged in the airtight hollow hand space, it possible to sufficiently dissipate heat from the device dissimilar to a case in which the device such as a sensor is arranged in a vacuum atmosphere. Accordingly, the device can be placed in the robot while sufficiently dissipating heat even in a case in which the robot is used in a vacuum atmosphere. Also, because the device such as a sensor can be arranged in the airtight hollow hand space, it is possible to prevent failure of the device caused by adhesion of dust or the like in space around the robot to the device. Also, because the device such as a sensor can be arranged in the airtight hollow hand space, it is possible to protect the device from a corrosive gas even in a case in which the robot is arranged in an atmosphere of the corrosive gas.

Accordingly, a device can be placed in a robot while sufficiently dissipating heat even in a case in which the robot is used in a vacuum atmosphere.

MODES FOR CARRYING OUT THE INVENTION

The following description will describe one embodiment embodying the present disclosure with reference to the drawings.

(Configuration of Substrate-Conveying Robot)

Figure 1:
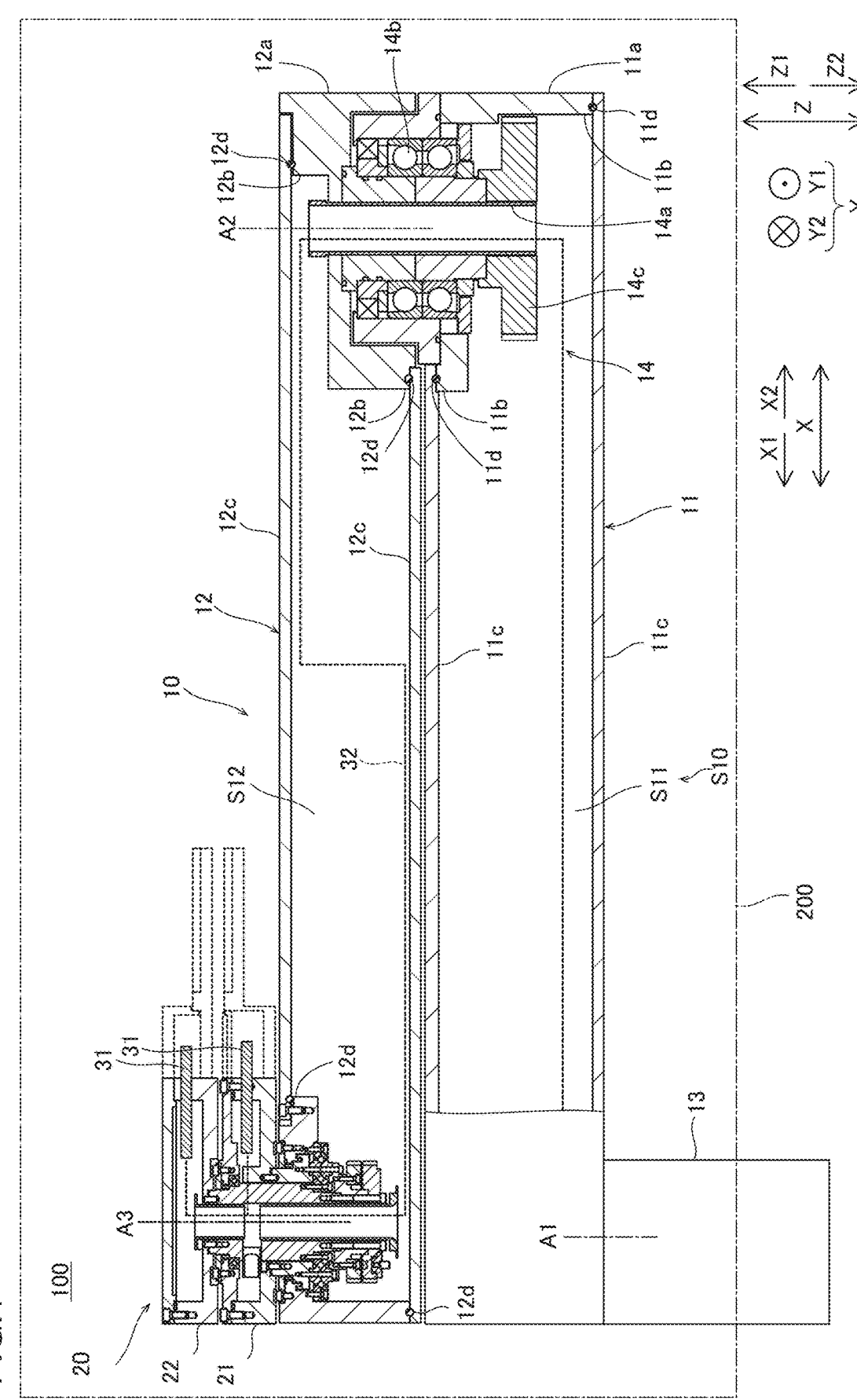
FIG. 1 is a view showing a configuration of a substrate-conveying robot according to one embodiment.
Figure 2:
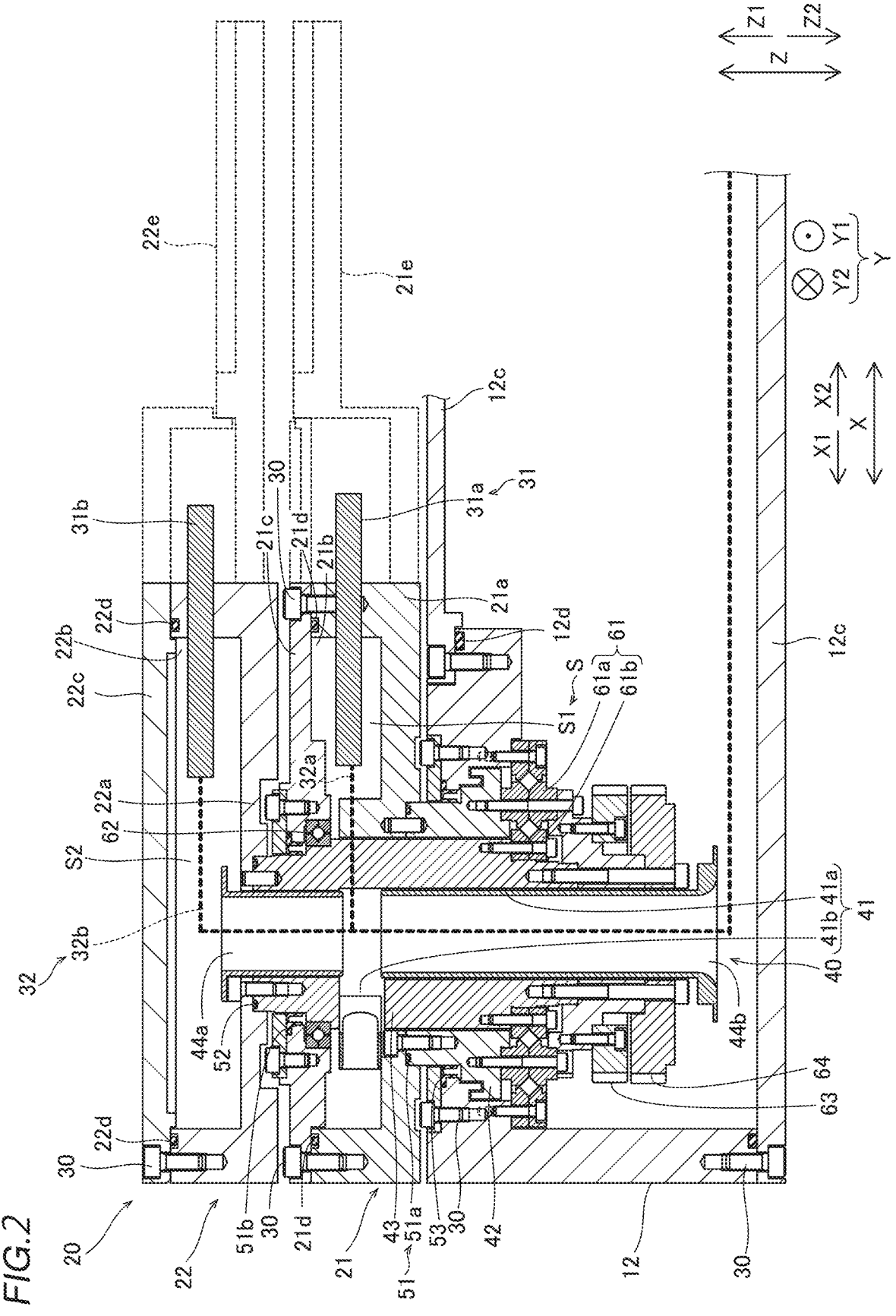
FIG. 2 is a view showing a configuration of a substrate-holding hand according to the one embodiment.
Figure 3:
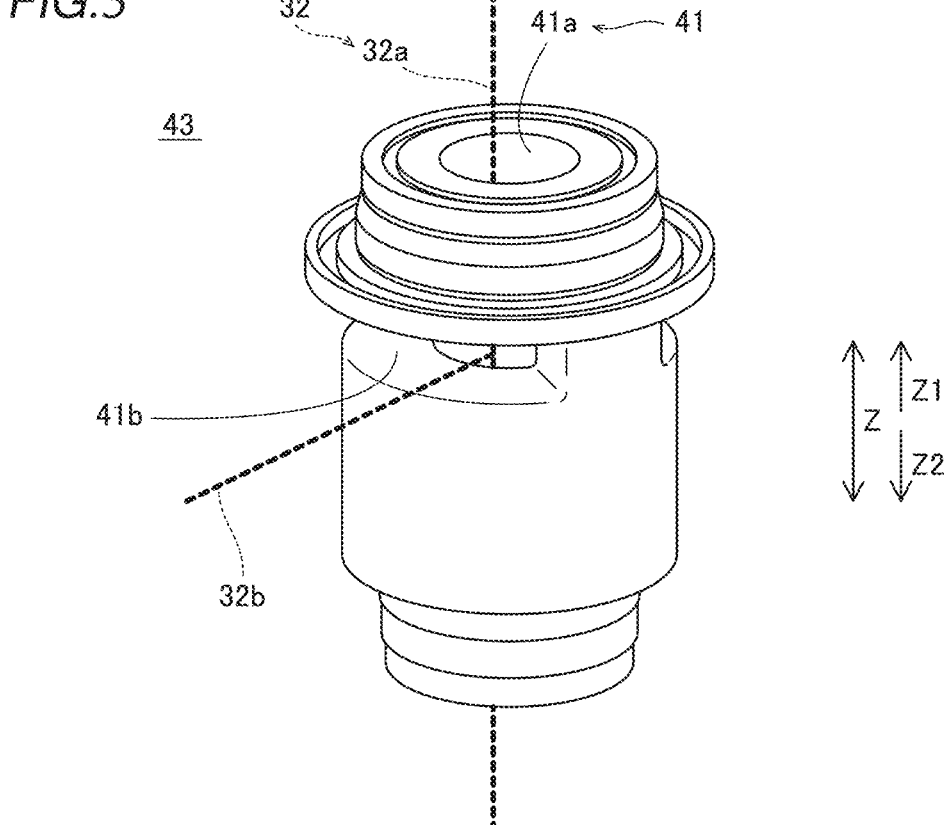
FIG. 3 is a plan view showing a configuration of a shaft element according to the one embodiment.

The following description describes a configuration of a substrate-conveying robot 100 according to one embodiment with reference to FIGS. 1 to 3. The substrate-conveying robot 100 is used in a vacuum atmosphere. As shown in FIG. 1, the substrate-conveying robot 100 is arranged in a chamber 200 whose interior is brought in a vacuum environment, for example. The substrate-conveying robot 100 includes a robot arm 10, a substrate-holding hand 20, a sensor 31, a shaft element 40, a first space seal 51, a second space seal 52, an arm seal 53, a first bearing 61, and a second bearing 62. The substrate-holding hand 20 is an example of a hand.

In this specification, the upward/downward direction is defined as a Z direction. An upper side is defined a Z1 side, and a lower side is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.

The robot arm 10 is a horizontal multi-joint robot arm. The robot arm 10 includes a first arm part 11 and a second arm part 12. One end of the first arm part 11 is connected to a cylindrical shaft part 13 that extends in the Z direction. One end of the first arm part 11 rotates about a rotation axis A1. One end of the second arm part 12 is connected to another end of the first arm part 11. The second arm part 12 is rotated about a rotation axis A2 with respect to the first arm part 11. The substrate-holding hand 20 is connected to another end of the second arm part 12.

In this embodiment, the robot arm 10 has an arm space S10 that is airtight in an atmospheric pressure state. Specifically, the first arm part 11 has a first arm space S11 that is airtight in an atmospheric pressure state. The second arm part 12 has a second arm space S12 that is airtight in an atmospheric pressure state. The first arm part 11 includes a housing body 11a having an opening 11b, and a lid 11c covering the opening 11b of the housing body 11a. An O-ring 11d is arranged between the housing body 11a and the lid 11c. The second arm part 12 includes a housing body 12a having an opening 12b, and a lid 12c covering the opening 12b of the housing body 12a. An O-ring 12d is arranged between the housing body 12a and the lid 12c. The first arm part 11 and the second arm part 12 are connected to each other by a shaft element 14. The shaft element 14 has a through hole 14a extending in the Z direction. The first arm space S11 and the second arm space S12 are to each other through the through hole 14a. The shaft element 14 is supported by a bearing 14b. The bearing 14b includes a ball bearing, for example. A gear 14c is arranged on the Z2 side of the shaft element 14. The second arm part 12 is rotated with respect to the first arm part 11 through the gear 14c driven by a driver. The first arm part 11 and the shaft part 13 are connected to each other by a shaft element similar to the shaft element 14, which connects the first arm part 11 to the second arm part 12.

The substrate-holding hand 20 is arranged in a distal end part of the robot arm 10. Specifically, the substrate-holding hand 20 is arranged in another end of the second arm part 12. The substrate-holding hand 20 includes a first hand 21 and a second hand 22. The second hand 22 is arranged on the Z1 side, which is an upward side with respect to the first hand 21. The second hand 22 operates independently of the first hand 21. The first hand 21 and the second hand 22 are rotated about a rotation axis A3 with respect to the second arm part 12.

In this embodiment, the substrate-holding hand 20 holds substrates. The substrates are semiconductor wafers, for example.

In this embodiment, at least one of the first hand 21 and the second hand 22 has a hollow hand space S that is airtight in an atmospheric pressure state as shown in FIG. 2. Air exists in the hand space S, which is airtight in the atmospheric pressure state. An exterior side of the first hand 21 and the second hand 22 is in a vacuum atmosphere so that air does not exist. Because the hand space S is airtight, there is no air communication between the hand space S and the exterior side of at least one of the first hand 21 and the second hand 22 in which the hand space S is provided.

In this embodiment, the first hand 21 has a hollow first hand space S1 that is airtight in an atmospheric pressure state. The second hand 22 has a hollow second hand space S2 that is airtight in an atmospheric pressure state. There is no air communication between the first hand space S1 and the exterior side of the first hand 21. There is no air communication between the second hand space S2 and the exterior side of the second hand 22.

In this embodiment, the first hand 21 having the first hand space S1, which is airtight in an atmospheric pressure state, includes a housing body 21a, a lid 21c, a lid seal 21d, and a blade 21e. The housing body 21a has an opening 21b. The lid 21c closes the opening 21b of the housing body 21a. The lid seal 21d seals the housing body 21a and the lid 21c. The lid seal 21d is arranged between an upper end art of the housing body 21a and the lid 21c. The first hand space S1 is a space enclosed by the housing body 21a and the lid 21c. The housing body 21a and the lid 21c are fastened to each other by a fastener 30. The lid seal 21d keeps the first hand space S1 airtight. The lid seal 21d includes an O-ring, for example. The blade 21e is arranged to extend in a horizontal direction from the housing body 21a. The blade 21e holds the substrate. Alternatively, the housing body 21a and the blade 21e can be directly connected to each other, or a connection element can be arranged between the housing body 21a and the blade 21e to connect the blade 21e to the housing body 21a.

In this embodiment, the second hand 22 having the second hand space S2, which is airtight in an atmospheric pressure state, includes a housing body 22a, a lid 22c, a lid seal 22d, and a blade 22e. The housing body 22a has an opening 22b. The lid 22c closes the opening 22b of the housing body 22a. The seal 22d seals the housing body 22a and the lid 22c. The seal 22d is arranged between an upper end art of the housing body 22a and the lid 22c. The second hand space S2 is a space enclosed by the housing body 22a and the lid 22c. The housing body 22a and the lid 22c are fastened to each other by a fastener 30. The lid seal 22d keeps the second hand space S2 airtight. The lid seal 22d includes an O-ring, for example. The blade 22e is arranged to extend in a horizontal direction from the housing body 22a. The blade 22e holds the substrate. The second hand 22 may hold two or more blades 22e. Alternatively, the housing body 22a and the blade 22e can be directly connected to each other, or a connection element can be arranged between the housing body 22a and the blade 22e to connect the blade 22e to the housing body 22a.

In this embodiment, the sensor 31 is arranged in the hand space S, which is airtight in an atmospheric pressure state. A part of the sensor 31 is arranged inside the hand space S. The other part of the sensor 31 is arranged outside the hand space S. For example, the sensor 31 includes a sensor 31a arranged in the first hand space S1, and a sensor 31b arranged in the second hand space S2.

In this embodiment, the sensor 31 includes at least one of a distance sensor and a vision sensor. The distance sensor measures a distance to the substrate held by the hand. The vision sensor captures an interior of space in which the substrate-conveying robot 100 is arranged.

In this embodiment, the shaft element 40 supports the first hand 21, the second hand 22 and the robot arm 10. The shaft element 40 is arranged to pass through the first hand 21, the second hand 22 and the second arm part 12. The shaft element 40 has a through hole 41 connecting the hand space S, which is airtight in the atmospheric pressure state, of at least one of the first hand 21 and the second hand 22 to the arm space S10. Specifically, the through hole 41 connects the first hand space S1 and the second hand space S2 to the arm space S10.

The shaft element 40 includes a first shaft element 42 and a second shaft element 43. The first shaft element 42 is connected to the first hand 21. The second shaft element 43 is arranged in the first shaft element 42. The second shaft element 43 is connected to the second hand 22. The first shaft element 42 and the first hand 21 are fixed to each other by fasteners 30 such as bolts. The second shaft element 43 and the second hand 22 are fixed to each other by fasteners such as bolts 30. The second shaft element 43 has a cylindrical shape. The first shaft element 42 has a cylindrical shape that surrounds an outer periphery of the second shaft element 43.

In this embodiment, the through hole 41 of the shaft element 40 includes a first through hole 41a and a second through hole 41b as shown in FIG. 3. The first through hole 41a connects the arm space S10 to the second hand space S2. The second through hole 41b connects the first through hole 41a to the first hand space S1. The first through hole 41a and the second through hole 41b are arranged in the second shaft element 43. The first through hole 41a is arranged to extend along a center axis of the cylindrical shape of the second shaft element 43. The second through hole 41b is arranged to extend perpendicularly to the first through hole 41a in a radial direction of the second shaft element 43 having the cylindrical shape.

As shown in FIG. 2, a cylindrical element 44a is arranged in a Z1-directional side part of the first through hole 41a with respect to the second through hole 41b. A cylindrical element 44b is arranged in a Z2-directional side part of the first through hole 41a with respect to the second through hole 41b.

In this embodiment, a wire 32 extending from the sensor 31 is arranged to extend from the hand space S through the through hole 41 of the shaft element 40 to the arm space S10. Specifically, a wire 32*a* extending from the sensor 31*a* is arranged to extend from the first hand space S1 through the second through hole 41*b* and the first through hole 41*a* of the second shaft element 43 to the arm space S10. A wire 32*b* extending from the sensor 31*b* is arranged to extend from the second hand space S2 through the first through hole 41*a* of the second shaft element 43 to the arm space S10. Although the wire 32*a* and the wire 32*b* are illustratively connected to each other in FIGS. 2 and 3, the wire 32*a* and the wire 32*b* are actually separated from each other.

In this embodiment, the first space seal 51 is arranged between the first hand 21 and the shaft element 40 to airtightly seal the first hand space S1. The first space seal 51 includes a first space seal 51*a* and a first space seal 51*b*. The first space seal 51*a* includes an O-ring, and is arranged between an upper end of the first shaft element 42 and a bottom of the housing body 21*a* of the first hand 21. The first space seal 51*b* includes a variseal, and is arranged between an upper end of the second shaft element 43 and the lid 21*c* of the first hand 21. The first space seal 51*b*, which includes the variseal, keeps the first hand space S1 of the first hand 21 airtight even when the first hand 21 and the second shaft element 43 rotate relative to each other.

In this embodiment, the second space seal 52 is arranged between the second hand 22 and the shaft element 40 to airtightly seal the second hand space S2. The second space seal 52 includes an O-ring. The second space seal 52 is arranged between the upper end of the second shaft element 43 and a bottom of the housing body 22*a* of the second hand 22.

In this embodiment, the arm seal 53 is arranged between the robot arm 10 and the shaft element 40 to airtightly seal the arm space S10. The arm seal 53 is arranged between an upper end of the second arm part 12 and the first shaft element 42. The arm seal 53 includes a variseal. The arm seal 53 keeps the arm space S10 of the second arm part 12 airtight even when the second arm part 12 and the first shaft element 42 rotate relative to each other.

In this embodiment, the first bearing 61 is arranged between the robot arm 10 and the shaft element 40. The first bearing 61 is arranged on an outer periphery of the shaft element 40. The first bearing 61 includes a cross roller bearing, for example. Also, the first bearing 61 includes a first bearing 61*a* that is connected to the first shaft element 42 by fasteners 30. Also, the first bearing 61 includes a first bearing 61*b* that is connected to the second shaft element 43 by fasteners 30. The first bearing 61*b* is arranged inside the first bearing 61*a*.

In this embodiment, the second bearing 62 is arranged between the first hand 21 and the shaft element 40. Specifically, the second bearing 62 is arranged between the lid 21*c* of the first hand 21 and the second shaft element 43. The second bearing 62 includes a ball bearing, for example.

A first gear 63 and a second gear 64 are arranged in a Z2 side part of the shaft element 40. The first gear 63 is connected to the first shaft element 42 by fasteners 30. The second gear 64 is connected to the second shaft element 43 by fasteners 30. The first gear 63 is driven by the driver so that the first hand 21 rotates relative to the second arm part 12. The second gear 64 is driven by the driver so that the second hand 22 rotates relative to the second arm part 12.

Advantages of the Embodiment

At least one of the first hand 21 and the second hand 22 has a hollow hand space S that is airtight in an atmospheric pressure state. According to this configuration, because a device such as the sensor 31 can be arranged in the airtight hollow hand space S, it possible to sufficiently dissipate heat from the device dissimilar to a case in which the device such as the sensor 31 is arranged in a vacuum atmosphere. Accordingly, the device can be placed in the substrate-conveying robot 100 while sufficiently dissipating heat even in a case in which the substrate-conveying robot 100 is used in a vacuum atmosphere. Also, because the device such as the sensor 31 can be arranged in the airtight hollow hand space S, which is airtight in an atmospheric pressure state, it is possible to prevent failure of the device caused by adhesion of dust or the like in space around the substrate-conveying robot 100 to the device.

The first hand 21 has a hollow first hand space S1 that is airtight in an atmospheric pressure state, and the second hand 22 has a hollow second hand space S2 that is airtight in an atmospheric pressure state. Accordingly, devices can be arranged both in the first hand 21 and the second hand 22 while heat is sufficiently dissipated.

The sensor 31 is arranged in the hand space S, which is airtight in an atmospheric pressure state. Accordingly, the sensor 31 can be placed in the substrate-conveying robot 100 while sufficiently dissipating heat even in a case in which the substrate-conveying robot 100 is used in a vacuum atmosphere.

The sensor 31 includes at least one of a distance sensor and a vision sensor. Accordingly, the at least one of the distance sensor and the vision sensor can be placed in the substrate-conveying robot 100 while sufficiently dissipating heat even in a case in which the substrate-conveying robot 100 is used in a vacuum atmosphere.

The robot arm 10 has the arm space S10 that is airtight in an atmospheric pressure state, and the shaft element 40 has the through hole 41 connecting the hand space S, which is airtight in the atmospheric pressure state, of at least one of the first hand 21 and the second hand 22 to the arm space S10. Accordingly, because the hand space S, which is airtight in an atmospheric pressure, and the hollow arm space S10, which is airtight in an atmospheric pressure, are connected to each other through the through hole 41 of the shaft element 40, an element that extends from the hand space S to the arm space S10 through the through hole 41 can be placed with being airtight in an atmospheric pressure.

The wire 32 extending from the sensor 31 is arranged to extend from the hand space S through the through hole 41 of the shaft element 40 to the arm space S10. Accordingly, because the wire 32 extending from the sensor 31 is not exposed to the outside of the substrate-conveying robot 100, it is possible to reduce dust rising into a vacuum atmosphere caused by movement of the wire 32 that is arranged outside the substrate-conveying robot 100 in response to movement of the substrate-conveying robot 100.

The through hole 41 of the shaft element 40 includes the first through hole 41*a*, which connects the arm space S10 to the second hand space S2, and the second through hole 41*b*, which connects the first through hole 41*a* to the first hand space S1. Accordingly, even in a case in which devices are arranged in the first hand space S1 and the second hand space S2 the wire 32 or the like can be placed from the first hand space S1 and the second hand space S2 through the through hole 41 of the shaft element 40 to the arm space S10.

The first space seal 51 is arranged between the first hand 21 and the shaft element 40 to airtightly seal the first hand space S1. The second space seal 52 is arranged between the second hand 22 and the shaft element 40 to airtightly seal the second hand space S2. The arm seal 53 is arranged between the robot arm 10 and the shaft element 40 to airtightly seal the arm space S10. Accordingly, the first hand space S1, the second hand space S2 and the arm space S10 can be easily airtightly sealed by the first space seal 51, the second space seal 52 and the arm seal 53, respectively.

The first bearing 61 is arranged between the robot arm 10 and the shaft element 40. The second bearing 62 is arranged between the first hand 21 and the shaft element 40. Accordingly, because both end sides of the axis line of the shaft element 40 are supported by the first bearing 61 and the second bearing 62, the shaft element 40 can be stably positioned.

The housing body 21*a*, the lid 21*c*, and the lid seal 21*d* make the first hand space S1 airtight in an atmospheric pressure. Accordingly, the first hand space S1 can be easily airtightly sealed by the lid seal 21*d*. Similarly, the second hand space S2 can be easily airtightly sealed by the lid seal 22*d*.

The substrate-conveying robot 100 includes the substrate-holding hand 20 for holding the substrates. Accordingly, the devices can be placed in the substrate-conveying robot 100 including the substrate-holding hand 20 while sufficiently dissipating heat even in a case in which the substrate-conveying robot is used in a vacuum atmosphere.

Modified Embodiments

Note that the embodiment disclosed this time must be considered as illustrative in all points and not restrictive. The scope of the present disclosure is not shown by the above description of the embodiments but by the scope of claims for patent, and all modifications (modified embodiments) within the meaning and scope equivalent to the scope of claims for patent are further included.

While the example in which the present disclosure is applied to the substrate-conveying robot 100 has been shown in the aforementioned embodiment, the present disclosure is not limited to this. For example, the present disclosure may be applied to a robot other than the substrate-conveying robot 100. For example, the present disclosure may be applied to a robot for replacing a maintenance parts, such as a focus ring, or to a self-propelled conveyor robot including a robot arm for conveying a part in a clean room.

While the example in which each of both the first hand 21 and the second hand 22 has a hollow hand space S has been shown in the aforementioned embodiment, the present disclosure is not limited to this. For example, only one of the first hand 21 and the second hand 22 may have a hollow hand space S.

While the example in which the sensor 31*a* is arranged in the first hand space S1 and the sensor 31*b* is arranged in the second hand space S2 has been shown in the aforementioned embodiment, the present disclosure is not limited to this. For example, devices other than the sensors 31 may be arranged in the first hand space S1 of the first hand 21 and the second hand space S2 of the second hand 22.

While the example in which the sensors 31 are arranged both in the first hand space S1 of the first hand 21 and the second hand space S2 of the second hand 22 has been shown in the aforementioned embodiment, the present disclosure is not limited to this. For example, the sensor 31 may be arranged in only one of the first hand space S1 and the second hand space S2.

While the example in which the sensors 31 arranged in the first hand space S1 of the first hand 21 and the second hand space S2 of the second hand 22 include at least one of a distance sensor and a vision sensor has been shown in the aforementioned embodiment, the present disclosure is not limited to this. For example, the sensors 31 arranged in the first hand space S1 of the first hand 21 and the second hand space S2 of the second hand 22 may be sensors other than the distance sensor and the vision sensor. For example, the sensor 31 may be a mapping sensor or an item existence sensor.

While the example in which the shaft element 40 includes the first through hole 41*a* and the second through hole 41*b* has been shown in the aforementioned embodiment, the present disclosure is not limited to this. For example, in a case in which the first hand 21 does not have the first hand space S1 and only the second hand 22 has the second hand space S2, the shaft element 40 has only the first through hole 41*a*.

While the example in which the first space seal 51*a* includes an O-ring has been shown in the aforementioned embodiment, the present disclosure is not limited to this. The first space seal 51*a* may include a seal other than the O-ring.

While the example in which the first space seal 51*b* includes a variseal has been shown in the aforementioned embodiment, the present disclosure is not limited to this. The first space seal 51*b* may include a seal other than the variseal.

While the example in which the second space seal 52 includes an O-ring has been shown in the aforementioned embodiment, the present disclosure is not limited to this. The second space seal 52 may include a seal other than the O-ring.

While the example in which the arm seal 53 includes a variseal has been shown in the aforementioned embodiment, the present disclosure is not limited to this. The arm seal 53 may include a seal other than the variseal.

While the example in which the lid seal 21*d* and the lid seal 22*d* includes an O-ring has been shown in the aforementioned embodiment, the present disclosure is not limited to this. The lid seal 21*d* and the lid seal 22*d* may include a seal other than the O-ring.

While the example in which the present disclosure is applied to the substrate-conveying robot 100 used in a vacuum atmosphere has been shown in the aforementioned embodiment, the present disclosure is not limited to this. For example, the present disclosure may be applied to a substrate-conveying robot arranged in a corrosive gas atmosphere. Accordingly, because a device such as the sensor 31 can be arranged in the airtight hollow hand space S, it is possible to protect the device from a corrosive gas even in a case in which the robot is arranged in the corrosive gas atmosphere.

While the example in which the hollow hand space S is airtight in an atmospheric pressure state has been shown in the aforementioned embodiment, the present disclosure is not limited to this. For example, the hollow hand space S may be airtight in a state other than atmospheric pressure state.

Modes

The aforementioned exemplary embodiment will be understood as concrete examples of the following modes by those skilled in the art.
(Mode Item 1)

A robot include a robot arm; and a hand arranged in a distal end part of the robot arm, wherein the hand includes a first hand, and a second hand arranged on or above the first hand and operating independently of the first hand, and at least one of the first hand and the second hand includes an airtight hollow hand space.

(Mode Item 2)

In the robot according to mode item 1, the first hand includes an airtight hollow first hand space as the hand space; and the second hand includes an airtight hollow second hand space as the hand space.

(Mode Item 3)

In the robot according to mode item 1 or 2, a sensor arranged in the airtight hand space.

(Mode Item 4)

In the robot according to mode item 3, the sensor includes at least one of a distance sensor and a vision sensor.

(Mode Item 5)

In the robot according to any of mode items 1 to 4, a shaft element supporting the first hand, the second hand, and the robot arm is further provided; the robot arm includes an airtight hollow arm space; and the shaft element includes a through hole connecting the airtight hand space of at least one of the first hand and the second hand to the arm space.

(Mode Item 6)

In the robot according to mode item 5, a sensor arranged in the airtight hand space is further provided; and a wire extending from the sensor is arranged to extend from the hand space through the through hole of the shaft element to the arm space.

(Mode Item 7)

In the robot according to mode item 5 or 6, the first hand includes an airtight hollow first hand space as the hand space; the second hand includes an airtight hollow second hand space as the hand space; and the through hole of the shaft element includes a first through hole connecting the arm space to the second hand space, and a second through hole connecting the first through hole to the first hand space.

(Mode Item 8)

The robot according to mode item 7 further includes a first space seal arranged between the first hand and the shaft element to airtightly seal the first hand space; a second space seal arranged between the second hand and the shaft element to airtightly seal the second hand space; and an arm seal arranged between the robot arm and the shaft element to airtightly seal the arm space.

(Mode Item 9)

In the robot according to any of mode items 5 to 8 further includes a first bearing arranged between the robot arm and the shaft element; and a second bearing arranged between the first hand and the shaft element.

(Mode Item 10)

In the robot according to any of mode items 1 to 9, the at least one of the first hand and the second hand, which includes the airtight hand space, includes a housing body including an opening, a lid closing the opening of the housing body, and a lid seal sealing the housing body and the lid; and the housing body, the lid and the lid seal make the hand space airtight.

(Mode Item 11)

In the robot according to any of mode items 1 to 10, the hand includes a substrate-holding hand for holding a substrate.

(Mode Item 12)

In the robot according to any of mode items 1 to 11, the robot is used in a vacuum atmosphere; and the hand space is airtight in an atmospheric pressure state.

The invention claimed is:

1. A robot comprising:

a robot arm; and a hand arranged in a distal end part of the robot arm, wherein the hand includes a first hand, and a second hand arranged on or above the first hand and operating independently of the first hand, the first hand includes an airtight hollow first hand space, a first sensor is arranged in the first hand space, the robot is used in a vacuum atmosphere, the first hand space is airtight in an atmospheric pressure state, and the first sensor includes a first part arranged inside the airtight first hand space and a second part arranged outside the airtight first hand space.

2. The robot according to claim 1, wherein the second hand includes an airtight hollow second hand space.

3. The robot according to claim 2 further comprising a second sensor arranged in the second hand space.

4. The robot according to claim 1, wherein the first sensor includes at least one of a distance sensor and a vision sensor.

5. The robot according to claim 1 further comprising a shaft element supporting the first hand, the second hand, and the robot arm, wherein the robot arm includes an airtight hollow arm space; and the shaft element includes a through hole connecting the first hand space to the arm space.

6. The robot according to claim 5, wherein a wire extending from the first sensor is arranged to extend from the first hand space through the through hole of the shaft element to the arm space.

7. The robot according to claim 5, wherein the second hand includes an airtight hollow second hand space; and the through hole of the shaft element includes a first through hole connecting the arm space to the second hand space, and a second through hole connecting the first through hole to the first hand space.

8. The robot according to claim 7 further comprising:

a first space seal arranged between the first hand and the shaft element to airtightly seal the first hand space;

a second space seal arranged between the second hand and the shaft element to airtightly seal the second hand space; and an arm seal arranged between the robot arm and the shaft element to airtightly seal the arm space.

9. The robot according to claim 5 further comprising:

a first bearing arranged between the robot arm and the shaft element; and a second bearing arranged between the first hand and the shaft element.

10. The robot according to claim 1, wherein the first hand includes a housing body including an opening, a lid closing the opening of the housing body, and a lid seal sealing the housing body and the lid; and the housing body, the lid and the lid seal make the first hand space airtight.

11. The robot according to claim 1, wherein the first hand is a substrate-holding hand for holding a substrate.

12. The robot according to claim 2, wherein the second hand space is airtight in an atmospheric pressure state.

* * * * *